US012731050B2

(12) United States Patent
Kim et al.

(10) Patent No.: US 12,731,050 B2
(45) Date of Patent: Sep. 8, 2026

(54) CONTENT DELIVERY OPTIMIZATION

(71) Applicant: Ivanti, Inc., South Jordan, UT (US)

(72) Inventors: Mansu Kim, San Jose, CA (US); Suresh Kumar Batchu, Campbell, CA (US); Benjamin Markines, Sunnyvale, CA (US)

(73) Assignee: Ivanti, Inc., South Jordan, UT (US)

( * ) Notice: Subject to any disclaimer, the term of this patent is extended or adjusted under 35 U.S.C. 154(b) by 808 days.

(21) Appl. No.: 17/992,660

(22) Filed: Nov. 22, 2022

(65) Prior Publication Data

US 2023/0206089 A1 Jun. 29, 2023

Related U.S. Application Data

(63) Continuation of application No. 14/473,724, filed on Aug. 29, 2014, now Pat. No. 11,556,808.

(60) Provisional application No. 61/871,783, filed on Aug. 29, 2013.

(51) Int. Cl.
*G06N 5/04* (2023.01)
*G06N 20/00* (2019.01)
*H04L 67/10* (2022.01)

(52) U.S. Cl.
CPC ............... *G06N 5/04* (2013.01); *G06N 20/00* (2019.01); *H04L 67/10* (2013.01)

(58) Field of Classification Search
CPC ........... G06N 5/04; G06N 20/00; H04L 67/10
See application file for complete search history.

(56) References Cited

U.S. PATENT DOCUMENTS

| | | | | |
|---|---|---|---|---|
| 6,138,156 | A | 10/2000 | Fletcher | |
| 7,856,373 | B2 | 12/2010 | Ullah | |
| 8,099,490 | B2 | 1/2012 | Deakin | |
| 8,321,568 | B2 | 11/2012 | Sivasubramanian | |
| 8,825,836 | B1 | 9/2014 | Gibson | |
| 9,131,013 | B2 | 9/2015 | Jemiolo | |
| 9,183,247 | B2 | 11/2015 | Priyadarshan | |
| 9,183,258 | B1 * | 11/2015 | Taylor | G06F 16/24578 |
| 2002/0016818 | A1 | 2/2002 | Kirani | |
| 2005/0193070 | A1 | 9/2005 | Brown | |
| 2005/0223073 | A1 | 10/2005 | Malik | |
| 2008/0242279 | A1 | 10/2008 | Ramer | |
| 2008/0256198 | A1 | 10/2008 | Kamat | |
| 2009/0030872 | A1 | 1/2009 | Brezina | |
| 2009/0125462 | A1 | 5/2009 | Krishnaswamy | |
| 2010/0085947 | A1 * | 4/2010 | Ringland | H04W 28/0226 370/338 |

(Continued)

OTHER PUBLICATIONS

Chua et al., "Mobile content contribution and retrieval: An exploratory study using the uses and gratifications paradigm", Information Processing and Managment, vol. 48, 2012, pp. 13-22.

(Continued)

*Primary Examiner* — Brian M Smith

(57) ABSTRACT

Content delivery optimization and recommendation is disclosed. A manner of delivering a content object to a mobile device may be determined at least in part by applying a behavior model associated with a user of the mobile device to attributes associated with the content object. The behavior model may be generated based at least in part on observed activities of the user. The content object is provided to the mobile device in the determined manner.

17 Claims, 9 Drawing Sheets

(56) References Cited

U.S. PATENT DOCUMENTS

2013/0303159 A1 11/2013 Gathala
2014/0053260 A1 2/2014 Gupta
2014/0173002 A1 6/2014 Frederick
2015/0156236 A1* 6/2015 McCall .................. H04L 65/60
709/204
2015/0223108 A1 8/2015 Skog

OTHER PUBLICATIONS

Jacquet et al., "Blackboard Rules for Coordinating Context-aware Applications in Mobile Ad Hoc Networks", from "https://arxiv.org/pdf/1209.1421.pdf", Sep. 6, 2012, pp. 1-16.

Korpipaa et al., "Managing Context Information in Mobile Devices", IEEE Pervasive Computing, vol. 2, issue 3, Jul. 2003, pp. 42-51.

* cited by examiner

500

CONTENT DELIVERY OPTIMIZATION

CROSS REFERENCE TO OTHER APPLICATIONS

This application is a continuation of U.S. patent application Ser. No. 14/473,724 entitled CONTENT DELIVERY OPTIMIZATION filed Aug. 29, 2014, which claims priority to U.S. Provisional Patent Application No. 61/871,783 entitled CONTENT DELIVERY OPTIMIZATION filed Aug. 29, 2013, each of which is incorporated herein by reference for all purposes.

BACKGROUND OF THE INVENTION

With increases in mobile device usage, more and more content is provided to mobile devices. Content is typically delivered in a predetermined manner, for example, determined by a user or an administrator associated with a network. For example, all content (e.g., email, documents, etc.) may be pushed directly to a mobile device (e.g., an email client on the device). In another example, all content (e.g., email, documents, content, etc.) may be provided to a device in a truncated form (e.g., cropped, compressed, and/or other reduced form). And delivery of information to a mobile device is typically performed regardless of importance or significance to the target audience (e.g., a user of the mobile device). For example, even if a user has never and/or rarely acts on similar content (e.g., views the content, responds to the content, etc.), a content object may still be delivered to the device (e.g., application on the device). Automatically pushing all content to a mobile device may result in substantial costs to a mobile device user and/or enterprise associated therewith. These costs may be increased if the device is often used while roaming. On the other hand, always delivering abbreviated and/or truncated versions of content to a mobile device may result in a less desirable user experience.

BRIEF DESCRIPTION OF THE DRAWINGS

Various embodiments of the invention are disclosed in the following detailed description and the accompanying drawings.

DETAILED DESCRIPTION

Figure 1:
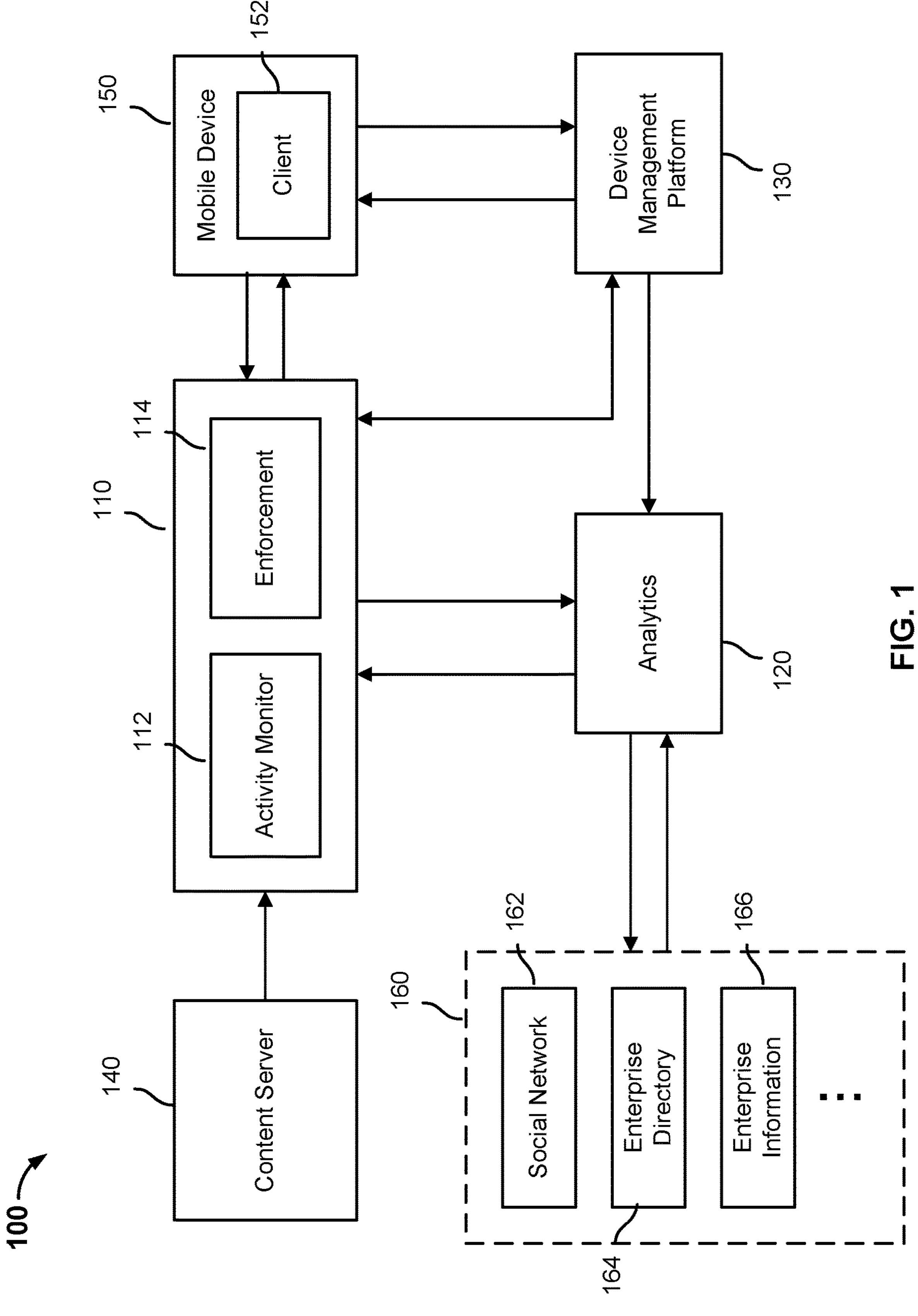
FIG. 1 is a block diagram illustrating an embodiment of a system to optimize content delivery.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Content delivery optimization and recommendation is disclosed. In various embodiments, content delivery may be optimized based on observed user activity, social graph information, device state information, active feedback, and/or other information. For example, content delivery may be optimized by compressing, summarizing, securing, and/or otherwise manipulating data (e.g., sent to a device). Content delivery may also be optimized by affecting user consumption related to content by, for example, providing alert notifications, language translation, and/or other processing.

In some embodiments, relations between user and content are analyzed. Social graph relations, such as who produced, sent, read, rated and/or reviewed content, are explored and may be used to optimize delivery of and/or recommend content. In some embodiments, content objects sent to a device may be ranked, prioritized, and/or otherwise categorized. Content that is deemed important may be pushed down to the device, while lesser important content may be delivered on demand with or without content modification (e.g., image quality degradation, translation to user's preferred language, etc.). An improved user experience is provided, while optimizing bandwidth, minimizing data traffic charges (e.g., data transfer charges, data roaming fees, etc.), and/or providing other benefits.

In various embodiments, a manner of delivering a content object to a mobile device may be determined at least in part by applying a behavior model associated with a user of the mobile device to attributes associated with the content object. The behavior model is generated based at least in part on observed activities of the user. The content object is provided to the mobile device in the determined manner.

FIG. 1 is a block diagram illustrating an embodiment of a system to optimize content delivery. In the example shown, a system 100 to optimize content delivery may include an intermediate node 110 (e.g., a proxy, security enforcement node, etc.), analytics engine 120 (e.g., analyzer, behavior model generator, etc.), a device management platform 130 (e.g., mobile device management (MDM) platform, security management platform, etc.), and/or other components. A content server 140 (e.g., content generator, content generation source, enterprise server, file servers, email server, hypertext markup language (HTML) server, application server, storage domain service, a non-enterprise email server, enterprise wiki server, etc.) may send content (e.g., content objects) to and/or receive content from a mobile device 150 (e.g., recipient mobile device, target mobile device, smartphone, tablet, etc.) and/or a client 152 (e.g., email client, file server client, etc.) included on the mobile device 150. Content may include, for example, email, documents, applications, application data, instant messages, text messages, audio, video, and/or any other type of content object(s). In various embodiments, the intermediate node 110 may be a proxy located between one or more content servers 140 and the mobile device 150. The intermediate node 110 may include, for example, an activity monitor 112 (e.g., monitoring agent, content monitor, data collection engine, content listener, etc.), an enforcement engine 114 (e.g., a policy engine, a rules engine, rules/policy enforcement engine, etc.), and/or other components.

According to some embodiments, a behavior model may be generated based on user- and/or content-related information gathered at the intermediate node 110, information from social layer data sources 160, information from a device management platform 130, and/or other sources. In some cases, the intermediate node 110 (e.g., activity monitor 112) monitors content sent to the mobile device 150 from the content server 140 and/or content sent from the mobile device 150 to the content server 140. The intermediate node 110 (e.g., activity monitor 112) may provide information associated with the content (e.g., content metadata, the content, etc.) to the analytics engine 120. For example, the intermediate node 110 (e.g., activity monitor 112) may provide information indicating user interaction with content (e.g., email, documents, etc.) including, for example, whether a user replies to, forwards, edits, deletes, stores, and/or otherwise interacts with content; a time between when the user receives the content and when the user reads, replies, forwards, edits, deletes, and/or otherwise interacts with the content; a context (e.g., a time, location, roaming or non-roaming, device state, type of application used to view, and/or other contextual information) of a user's interaction with content; and/or other information. The user and/or content-related information may be used (e.g., by the analytics engine 120) to generate a behavior model. As discussed below, the behavior model may indicate a user's observed behavior, preferences, and/or other traits in relation to content attributes. And the behavior model may be used to determine a manner of delivering content to a user's mobile device.

In various embodiments, a behavior model may include information from social data sources 160 (e.g., social layer data sources) including, for example, social networks 162 (e.g., an enterprise social network (e.g., Yammer™), business contact network services (e.g., LinkedIn™), Facebook™, Twitter™, etc.), enterprise directories 164 (e.g., an enterprise Lightweight Directory Access Protocol (LDAP) directory, Active Directory Server, and/or server), enterprise information server 166 (e.g., enterprise wiki), private data sources (e.g., customer relationship management (CRM) services), and/or other social data source. In various embodiments, information may be retrieved from the social data sources 160 according to a schedule (e.g., at predetermined times), in response to a notification (e.g., a notification indicating an update to a data source 160), and/or at other times. The retrieved information may be cached (e.g., at the analytics engine 120), indexed, and/or otherwise made available to the analytics engine 120.

According to some embodiments, mobile device context data may be received (e.g., retrieved) from, for example, a device management platform 130. Mobile device context information may include, for example, information representing a state of the device. Information representing a state of a device may include, for example, a location of device, whether the device is roaming, a network to which the device is connected (e.g., WiFi, LTE, cellular, etc.), applications included on the device, mobile device capabilities (e.g., supported file types), a mobile carrier associated with device, carrier service plan, whether device is jailbroken, whether device is updated, and/or any other mobile device state-related information.

In various embodiments, the analytics engine 120 may generate/update a behavior model based on information indicating a user's activities (e.g., content-associated information, user-associated information (e.g., user activity information)), social information associated with the user, mobile device context information, and/or other information received from the intermediate node 110, social layer data sources 160 (e.g., social networks 162, enterprise directories 164, enterprise information sources 166, etc.), device management platform 130, and/or other sources. In some cases, the analytics engine 120 may distinguish between an application's automated behavior and a user's activity (e.g., in a context of the application).

In various embodiments, a behavior model may represent a user's behavior in such a way that the model can be used to determine (e.g., predict) an appropriate manner (e.g., compressing, modifying, removing, etc.) of delivering content (e.g., content objects) to a user. In some embodiments, a behavior model may be generated using a machine learning approach (e.g., rule based engines, classification models, statistical models, and/or any other machine learning algorithm/approach). Generation of a behavior model using machine learning and/or other approaches is discussed below.

According to some embodiments, the behavior model and/or information associated with the behavior model may be provided to the intermediate node 110 (e.g., an enforcement engine 114 associated with the intermediate node 110). For example, the behavior model, information representing possible outputs (e.g., all possible outputs) of the behavior model, a representation of the behavior model (e.g., an abstract representation of the behavior model), and/or other information associated with the behavior model may be provided to the enforcement engine 114 (e.g., a node associated with the intermediate node 110), a content server 140, and/or another node.

According to various embodiments, the intermediate node 110 (e.g., the enforcement engine 114) may store the behavior model and/or information associated with the behavior model in local storage (e.g., local memory associated with the intermediate node 110). By storing the behavior model and/or information associated with the behavior model in local storage, the intermediate node 110 (e.g., enforcement node 114) may be able to quickly retrieve the behavior model information and apply the model to content objects passed through the intermediate node 110. In various embodiments, the behavior model, information associated with the behavior model, content delivery rules, and/or other information may be applied to attributes associated with a content object to determine a manner of delivering the content object to the mobile device.

In some embodiments, one or more content delivery rules may be generated based on the behavior model. The rules may be stored, for example, at the intermediate node 110 (e.g., in storage associated with the enforcement engine 114). In some cases, the rules may be generated and/or managed by the device management platform 130 (e.g., MDM platform). In certain cases, outputs of the behavior model may be used to generate rules to be applied to content objects in determining a manner of delivery of the content object to a mobile device.

Figure 2:
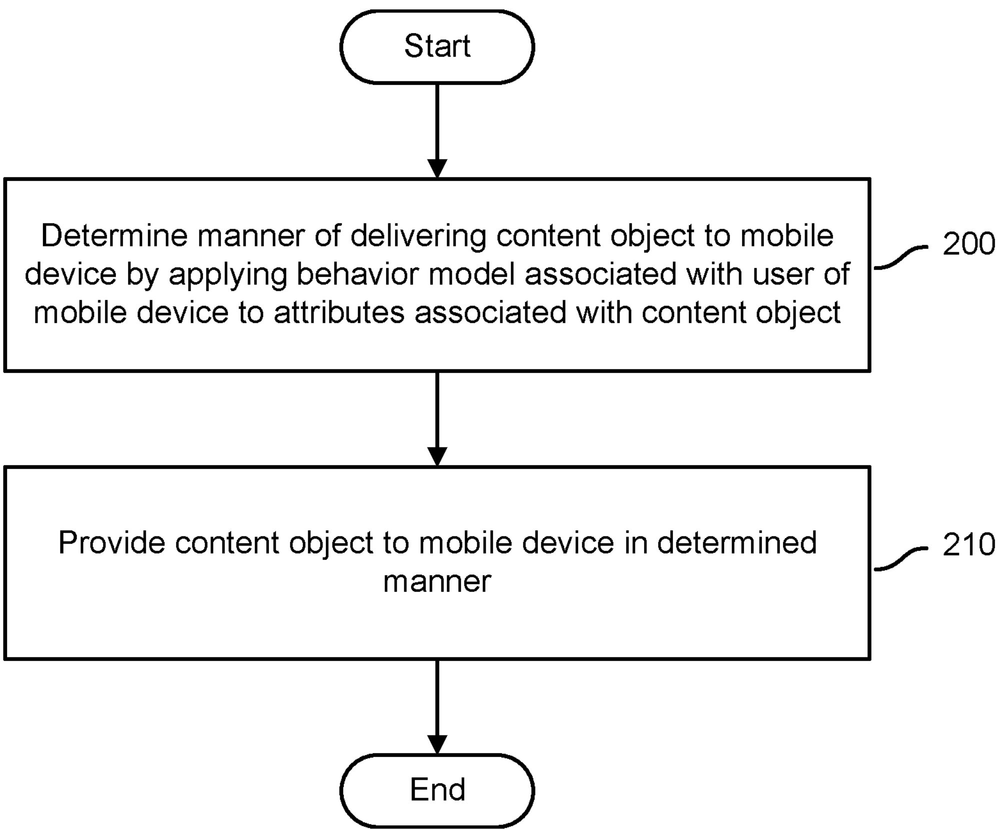
FIG. 2 is a flow chart illustrating an embodiment of a process of content delivery optimization.

FIG. 2 is a flow chart illustrating an embodiment of a process of content delivery optimization. In various embodiments, this process may be implemented on intermediate node 110, content server 140, and/or other nodes depicted in FIG. 1. At 200, a manner of delivering a content object to a mobile device may be determined at least in part by applying a behavior model associated with a user of the mobile device to attributes associated with the content object. In some embodiments, a behavior model may be applied to attributes associated with a content object at an intermediate node (e.g., proxy 110 of FIG. 1) as the content object is passed from a content generator (e.g., content generator 140 of FIG. 1) to a user's mobile device (e.g., mobile device 150 of FIG. 1). In various embodiments, a behavior model may be applied to a content object at a content generator (e.g., prior to sending the content object to the user's mobile device) and/or another node. In certain cases, a behavior model may be applied partially at a first node (e.g., content generator) and partially at another node (e.g., a proxy).

In various embodiments, a behavior model associated with a user may include elements (e.g., a user's connections, content types, content formats, and/or other elements as discussed in detail below) and each of one or more the elements may be associated with a weight. The elements and associated weights may be generated based on information indicating user activity (e.g., monitored at an intermediate node), information indicating a user's social connections (e.g., from social layer data sources), device state information (e.g., from a device management platform, the mobile device, etc.), and/or other information. In some embodiments, the behavior model and/or information associated with the model may be applied to attributes associated with a content attribute to determine a manner of delivering the content object to the mobile device. In various embodiments, the behavior model may be used to generate one or more content delivery rules and/or policies. And the rules and/or policies may be applied to attributes associated with the content object to determine a manner of delivering the content object to a mobile device.

At 210, the content object may be provided to the mobile device in the determined manner. In some embodiments, the manner of delivering the content object may include delivering the content object to the device without processing and/or modification. In various embodiments, the content object may be processed according to the manner of content delivery, and the processed content object may be provided to the mobile device. For example, a manner of content delivery may dictate that a compressed version of a content object be sent to a mobile device. The content object (e.g., an email) may be compressed (e.g., truncated, processed to remove attachments, processed to compress attachment files, etc.), and the compressed content object may be delivered to the device. In another example, a manner of content delivery may dictate that a content object and/or portions thereof may be secured (e.g., encrypted) prior to delivery. In the case the content object may be encrypted and then sent to the mobile device.

In various embodiments, the techniques disclosed herein may be used to prioritize content delivery based on a user's location, planning (e.g., calendar events), connection type, device state, and/or other information. In some cases, rules may be generated based on the elements of a model. And the rules may be applied to attributes associated with content objects. For example, a device agent on a user's mobile device may detect a user's location (e.g., user is waiting at San Francisco airport to fly), a type of network connection (e.g., Wi-Fi connection), a device state that allows full content download (e.g., device has 70% or more battery power), and/or the user plans to travel (e.g., to London), and/or other information/attributes. Based on the detected information/attributes, a configurable rule based system may initiate a full content push to the device so the traveler may read the content while on the plane. In certain cases, the user may also be able to manually trigger downloading. In some embodiments, to assist (e.g., help) a user's decision to initiate manual download of contents, a summary of the contents (e.g., a summary of text content, file types, size, etc.) may be provided with a link to download the content.

In some embodiments, the techniques disclosed herein may be used to prioritize delivery based on a user's content preferences. For example, it may be determined that a user prefers a certain filename, file content (e.g., topics, words, images, and/or other information included in the content), and/or other content attribute. This information may be included in a behavior model for the user. For example, if a user always downloads, reads, and/or comments on a file with the name "project todo.docx," any content objects including the title and/or string "project todo.docx" may be pushed to the user's device, while other content may not be pushed to the device.

In various embodiments, the techniques disclosed herein may be used to optimize message delivery based on user's preferred language. For example, a user's language preference may be determined based on behavior (e.g., information including the user's activities, information from social data sources, information from an enterprise directory, etc.). For example, a user may be observed to frequently type in English, sometimes generate content in Korean, but never write in Chinese. When a message enters the system in a language that the user can't understand (e.g., as determined based on the behavior model, content deliver rules, etc.), a policy enforcement node (e.g., associated with the intermediate node) may shorten/filter the message and/or translate the message to the user's preferred language. Using the techniques disclosed herein content may be shared with colleagues in their preferred language.

Figure 3:
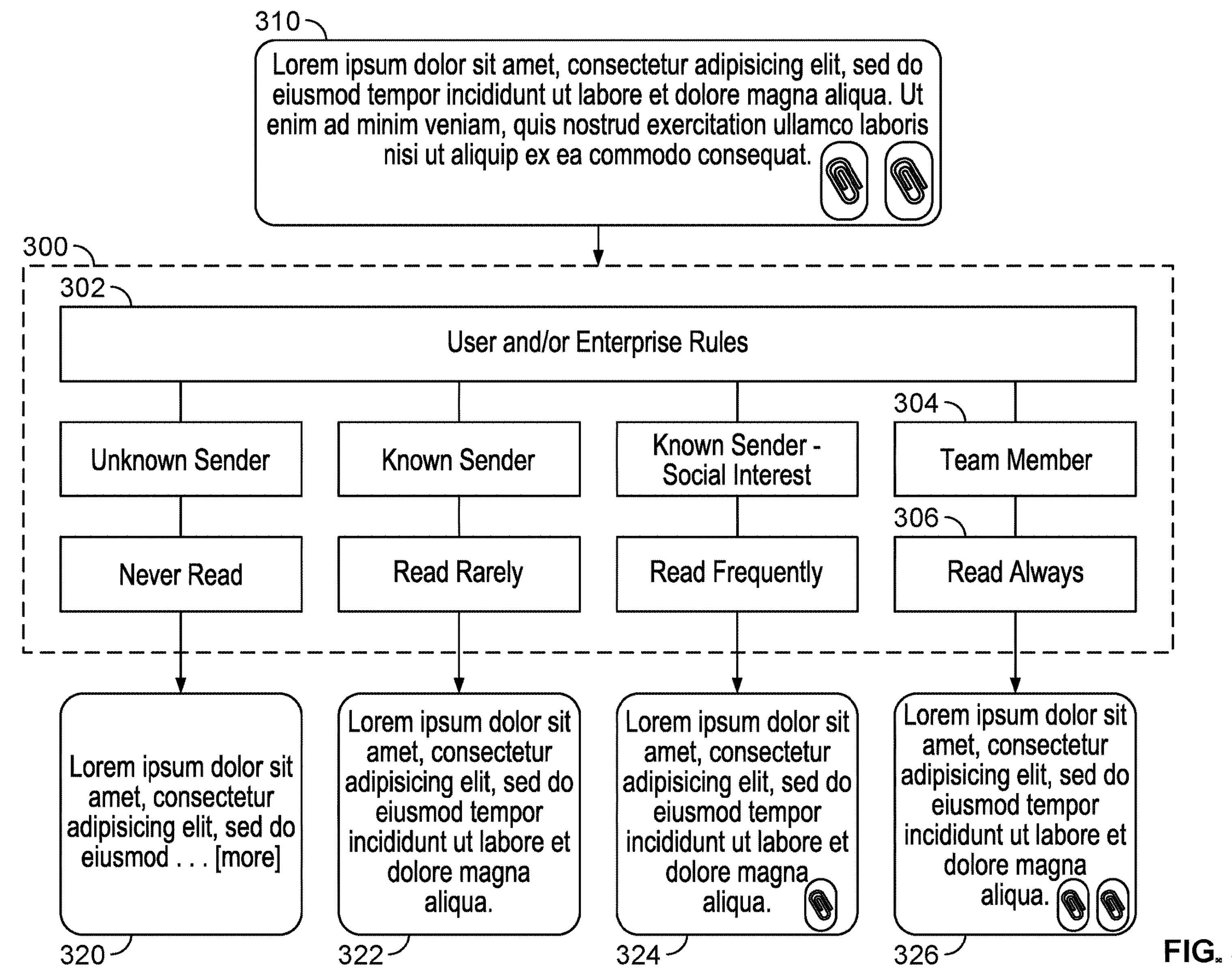
FIG. 3 is a block diagram illustrating an embodiment of content delivery optimization.

FIG. 3 is a block diagram illustrating an embodiment of content delivery optimization. In the example shown, an example representation of a behavior model 300 is depicted. In various embodiments, the behavior model 300 and/or portions thereof may be implemented as a set of rules, policies and/or preferences. The behavior model 300 may include, for example, a configuration layer 302, social layer 304, user activity layer 306, and/or other layers. The configuration layer 302 may include rules and/or policies defined by a user associated with the model, an enterprise associated with the user, and/or other entity. The social layer 304 may include groups/categories of individuals (e.g., user profiles) determined based on the user's observed interaction with content; the user's connections in social networks, an enterprise directory, enterprise data sources (e.g., enterprise wiki), and/or other social data sources; and/or other userand/or content-related information. A content object 310 (e.g., received at intermediate node) may be associated with a particular group based on an analysis of attributes associated with the content object (e.g., metadata indicating an author, sender, editor, etc. of the content object). An activity layer 306 may include a user's observed actions related to content objects. Information included in the activity layer 306 may be generated based on a user's historical observed interactions with content (e.g., as observed/monitored by an intermediate node, content generator, mobile device, etc.). In certain cases, activity layer 306 categories (e.g., never read, read rarely, read frequently, read always, etc.) may be associated (e.g., each associated) with a groups in the social layer 304. For example, a behavior model 300 may indicate that the user never reads emails from unknown senders (e.g., senders that have not previously sent the user email, senders not in the user's social network, enterprise group, etc.). Similarly, the behavior model may indicate that the user rarely reads emails from known senders (e.g., known senders without a social connection (e.g., as indicated in social network, enterprise director, and/or other data)), frequently reads emails from known senders with a social connection, and/or always reads emails from team members (e.g., as indicated in an enterprise directory).

In various embodiments, a manner of delivery may be determined based on the application of the behavior model and/or rules derived therefrom to attributes associated with a content object 310. In the example shown, a content object 310 may be processed (e.g., parsed) to determine (e.g., identify) attributes of the content object. For example, attributes associated the content object 310 may include a sender of the content object, keywords in the body of the content object, topics included in the content object, a size of the content object (e.g., file size), whether the content object 310 includes attachments, and/or other information. The behavior model, rules and/or policies 302 (e.g., included in a configuration layer of the model 300) may be applied to the attributes associated with content object 310. In the event the attributes satisfy a rule, a manner of content delivery associated with that rule may be selected, and the content object 310 may be delivered to the user's mobile device in the selected manner. In one example, based on application of the behavior model to attributes associated with the content object, it may be determined that the email content object is sent to the user from an unknown sender. Because the behavior model indicates that the user never reads messages from unknown senders, a first manner of content delivery 320 may be selected. Using the first manner 320, a truncated version of the email not including attachments (e.g., including a link to additional content in the body of the email) may be generated and pushed to the user's mobile device. In the event the user opens the email, the remaining content may be pulled from the content server. Not sending the entire message and attachments when a user is unlikely to read the message may reduce bandwidth usage, reduce data charges (e.g., roaming charges), and/or improve the mobile device user experience. In another example, a content object 310 determined to be from known sender not socially-associated with the user may be delivered to the user's mobile device using a second manner of content delivery 322. Executing the second manner of content delivery 322, the full content of an email with no attachments may be delivered to the mobile device. In a further example, a content object 310 determined to be from a known sender that is socially connected to the user (e.g., as indicated by social network, enterprise directory, enterprise wiki, and/or other data) may be sent to the user using a third manner of content delivery 324 (e.g., with full content and important attachments). In an additional example, applying the behavior rule to a content object 310 from the user's manager (e.g., a member of the user's team), a fourth manner of delivery 326 may be selected in which the full content and all attachments are pushed to the device. In some cases, the user may also be notified of the email via an alternate channel (e.g., text message, voice mail, etc.) if the user does not respond to the message with a predetermined time period.

Figure 4:
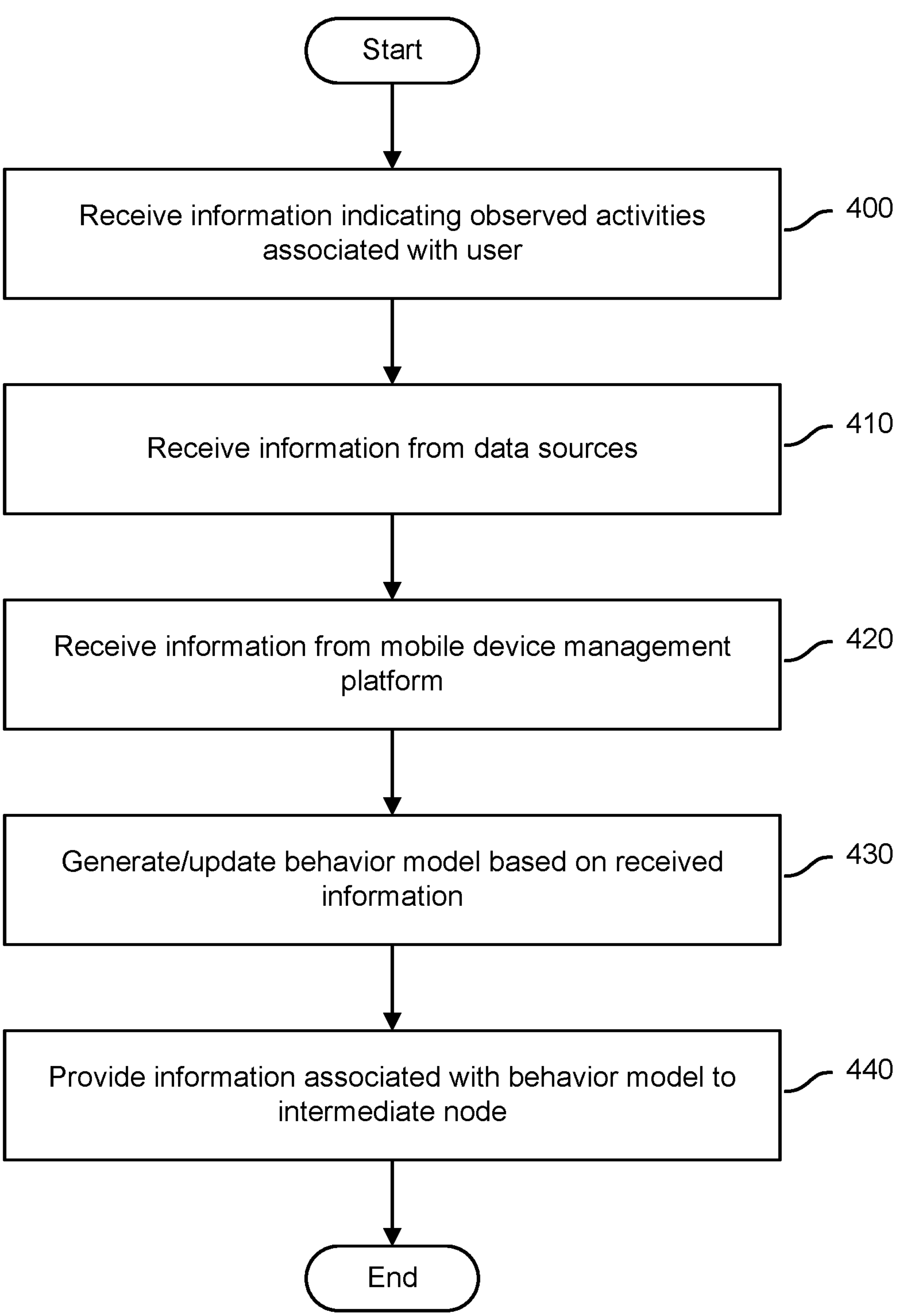
FIG. 4 is a flow chart illustrating an embodiment of a process to generate a behavior model.

FIG. 4 is a flow chart illustrating an embodiment of a process to generate a behavior model. In various embodiments, this process may be implemented at analytics engine 120 of FIG. 1. At 400, information indicating observed activity associated with a user may be received. In some embodiments, information indicating observed activities of the user may be received (e.g., at an analytics engine) from, for example, a content server, intermediate node (e.g., proxy situated between a content server and mobile device), a mobile device management platform, mobile device(s), and/or other nodes. The examples disclosed herein in various embodiments describe the system in the context of an architecture in which an intermediate node (e.g., proxy) passes (e.g., provides, broadcasts, etc.) information to an analytics engine. Other architectures are, however, within the scope of the present disclosure. For example, an architecture in which a content server and mobile device provide information directly to the analytics engine (e.g., separate from the content server and/or associated with the content server) and/or other architectures are within the scope of the present disclosure.

According to some embodiments, content objects and/or other data may be sent from a content server to an intermediate node for delivery to the mobile device. Similarly, the mobile device may provide content objects and/or other data to the intermediate node for delivery to the content server. In some cases, the mobile device may provide to the intermediate node information associated with the activities of a user (e.g., activity in relation to content, the mobile device, etc.) including, for example, information indicating a user's interaction with content (e.g., user has read/opened content, user is editing content, content version information, etc.), commands (e.g., commands to pull content (e.g., emails, documents) from the content server), active feedback (as discussed below), and/or other information. In various embodiments, the activity monitor (e.g., associated with the intermediate node) may gather (e.g., monitor) information from the content and/or the user's interaction with the content. For example, the activity monitor may gather attributes associated with content including, for example, content type (e.g., email, document, portable document format (PDF), image, etc.), email metadata (e.g., email metadata sender identity (email address, profile, etc.), recipient identit(ies), carbon copy recipients, title, body, email content, date/time of email send, date/time of email repl(ies), email attachment information, and/or other data), document metadata (e.g., author(s), editor(s), edit times, revision information, document title, document type, etc.), applications, application metadata (e.g., application version data, and/or other metadata), information included in the content (e.g., content topics), and/or any other attributes. The activity monitor may gather information indicating (e.g., representing) user interaction with content including, for example, whether a user replies to, forwards, edits, deletes, stores, generates a calendar event based on content, and/or otherwise interacts with content; a time between when the user receives the content and when the user reads, replies, forwards, edits, deletes, and/or otherwise interacts with the content; a context (e.g., a time, location, roaming or non-roaming, device state, type of application used to view, and/or other contextual information) of a user's interaction with content; and/or other information. Many other types of information may be monitored (e.g., gathered).

In various embodiments, the gathered (e.g., monitored) content-associated information, user-associated information (e.g., user activity information), and/or other information may be provided (e.g., published) to the analytics engine and/or other systems (e.g., other systems subscribed to receive information from the activity monitor). In one example, a process (e.g., performed at the activity monitor) listens to the proxy in order to publish relevant information on a unique channel to an analytics server. The information indicating observed activities of a user may be cached (e.g., at the analytics engine), indexed, and/or otherwise made available to the analytics engine.

At 410, information may be received (e.g., retrieved) from social data sources, directory sources, and/or other data sources. Information may be received from, for example, an enterprise social network, business contact network services, a social network service, enterprise directories, enterprise information sources, private data sources, and/or other data sources. In various embodiments, the analytics engine may extract social information associated with user including, for example, a user's connections, content published by the user, a user's likes/interests on the social network, a user's follows on the social network, and/or any other information associated with the user. For example, information retrieved from social data sources may indicate a user's connections, interests (e.g., topics of interest), languages preferences (e.g., language fluencies), personality traits, and/or other information.

In various embodiments, information may be retrieved from social sources according to a schedule (e.g., at predetermined times), in response to a notification (e.g., a notification indicating an update to a data source), and/or at other times. The retrieved information from social and/or other data sources may be cached (e.g., at the analytics engine), indexed, and/or otherwise made available to the analytics engine. In various embodiments, a user may be prompted to authorize (e.g., allow) retrieval of data from social data and/or other data sources (e.g., associated with that user). In the event the user does not authorize data retrieval from social and/or data sources and/or upon the occurrence of other events, this step may not be performed (e.g., skipped).

At 420, information may be received from a mobile device management platform. According to some embodiments, mobile device context data may be received (e.g., retrieved) from a device management platform. Mobile device context data may include, for example, data representing a state of the device (e.g., included in a device state report). Information representing a state of a device may include, for example, a location of device, whether device is roaming, networks to which the device is connected (e.g., cellular, WiFi, LTE, etc.), applications installed on the device, application settings (e.g., application cache size), a mobile carrier associated with device, carrier service plan, whether device is jailbroken, whether device is updated (e.g., operating system version), and/or any other mobile device state-related information.

At 430, a behavior model is generated and/or updated based on the received information. In various embodiments, a behavior model may be generated and/or updated based on the received (e.g., retrieved) information including, for example, information representing observed activities associated with a user (e.g., received from an intermediate node), information from social data sources (e.g., social networks), information from directory-related sources (e.g., enterprise directory), information from a mobile device management platform, and/or any other information associated with a user. In some cases, information from multiple sources may be serialized (e.g., at the analytics engine) and/or otherwise processed (e.g., parsed). For example, a process/module (e.g., a process/module associated with analytics engine) that subscribes to a unique channel (e.g., a data feed from the activity monitor) may serialize information independent of a proxy and/or other data source.

In some embodiments, serialized information may be used to generate a behavior model. In one example, a behavior model may include an average time a first user takes to react to (e.g., read, reply to, forward, etc.) emails from a second user, a frequency at which a user deletes content of a certain type (e.g., before reading the content), and/or any other combination of the user activity and/or other information. In another example, a behavior model may include sets/groups of individuals (e.g. other users) to which a user is connected (e.g., as determined by observed activities, social network information, enterprise directory information, etc.). The sets/groups of individuals may ranked and/or associated with weights indicating an importance of the set to the recipient device user. Many other types of behavior models may be generated.

In various embodiments, a behavior model may be generated using a machine learning algorithm (e.g., Naïve Bayes, AdaBoost, etc.). By way of example, information received from various sources including, for example, information indicating observed activities of a user, social network information, enterprise directory information, device state information, and/or any other user- and/or device-related information may processed into a set of attributes (e.g., attributes $x_0$ thru $x_N$). In one example, attributes may include, for example, a person included in a "from:" field of an email, a duration of time between receipt of an email and opening of an email, a user's connections on a social network (e.g., as retrieved from a social network), a geographic location at which a user opens an email (e.g., from device state information), and/or any other attributes. A learning algorithm and/or other approach may assign a weight to each of the attributes. In certain cases, each attribute may be evaluated independently to assign a weight. The behavior model may include multiple attributes and a weight for each attribute. And the model may be used to predict a user behavior in relation to content. As discussed below a behavior model may be used to determine an appropriate manner of delivery of a content object (e.g., received at an intermediate) to a mobile device associated with the user.

In various embodiments, a behavior model may include a probabilistic model. In certain cases, a probabilistic model may include a class of actions (e.g., manners of delivery). By way of example, a behavior model may be generated to evaluate whether to push a content object to a user's device or to not push the content object to device (e.g., hold the email at for example, the intermediate node, content server, and/or other node). In generating a probabilistic model, a training phase may be conducted in which conditional probabilities may be determined for each of multiple content-, user-, and/or device-related attributes. For example, a conditional probability (e.g., $P(d_p|x)$) that content object should be pushed (e.g., $d_p$, where $d \in D$ and D is the set of delivery options) to a user given a first attribute (e.g., $x_0$ where $x \in X$ and X is the set of 'from:' users) of a person listed in the "from:" field may be generated. Similarly, a conditional probability (e.g., $P(d_P|L_1)$) that a content object should be pushed (e.g., $d_p$) to a user given a second attribute (e.g., $l_1$, where $l \in L$ and L is the set of locations) of a location of the user. This process may be continued and conditional probabilities may be generated for one or more additional attributes. The conditional probabilities may, for example, be determined in a training operation based on the received information. For example, if it is determined (e.g., based on observed user activities, social network information, etc.) that a user is more likely to open an email from a specific sender, the conditional probability that a content object should be pushed given that sender may high. In various embodiments, the conditional probabilities associated with pushing a content object to user may be summed, integrated, have the max function applied to, and/or otherwise combined. In one example, an integral of the conditional probabilities may be determined (e.g., $\int P(D_P|X_N)$). In various embodiments, a similar process may be used to determine conditional probabilities associated with a decision not to push a content object to the device. As discussed below, these probabilistic models may be applied to attributes associate with a content object to determine whether or not to push the content object to user. The probabilistic behavior model is one example behavior model; however, any other type of behavior model may be generated using machine learning and/or other approaches.

In one example, the serialized information may, for example, be copied (e.g., periodically copied) to an analytics engine (e.g., Hadoop cluster, R engine). In certain cases, a first script (e.g., an Apache Spark script) may construct a behavior model, while a second script (e.g., Python script) may serialize the results of the behavior model into a local storage (e.g., a cache, relational database, etc.). In various embodiments, a behavior model for a user may include elements including other users, content attributes (e.g., content types, content formats, etc.), and/or other information. The behavior model may include a weight for each of a set of users, content attributes, and/or information. In various embodiments, the behavior model may be stored in a local memory and/or provided to an external node (e.g., intermediate node). In certain cases, to identify a most up to date behavior model (e.g., for a user), a unique identifier that prefixes each entry of the model may be stored. In one example, a unique identifier may include a number of seconds elapsed since a time (e.g., epoch). In this case, a behavior model may include a first user's (e.g., an employee's) average email read time for emails from a second user (e.g., the employee's manager). A key and/or other identifier (e.g., a constructed redis key) may include a 'unique identifier'+'user'+'from user' (e.g., the user's boss).

In various embodiments, a behavior model may be updated and/or generated to include information retrieved from social data sources, directory service sources, an MDM platform, and/or other sources. For example, information from a social network may include metadata indicating a user's connections (e.g., friends, followers, follows, etc.). Based on, for example, social network information and/or enterprise directory information (e.g., enterprise user groups, organization units (OU)) indicating that a first user is associated with a second user, a behavior model may be updated to increase a weight associated with the second user in the behavior model. In another example, information from social networks, enterprise data service (e.g., enterprise wiki), and/or other source may indicate that a user is interested and/or has expertise in a topic (e.g., user interface design). Based on this information, a behavior model may be updated to increase a weight associated with the topic (e.g. user interface design). In another example, a behavior model may be updated to include device state information. The device state information may indicate, for example, locations associated with the mobile device at various times. The location information may be correlated to observed user activity information and/or other received information to update the behavior model. For example, the correlation of device state information to observed user activity information may indicate that a user is more likely to read content (e.g., emails) from a certain sender (e.g., the user's colleagues) while located at first location (e.g., at work) than while located at a second location (e.g., at home). Based on this information, a weight associated with the first location may be increased, and a weight associated with the second location may be decreased and/or remain unchanged.

In some embodiments, using the techniques disclosed herein information from a first domain (e.g., a user's social network connections) may be used to predict a user behavior in a second domain (e.g., a domain associate with content). For example, a behavior model generated based on information from a social network and/or enterprise directory may be used to predict a user's actions upon receiving email content (e.g., emails pushed to a user's mobile device).

In various embodiments, a behavior model associated with user may be regenerated periodically and/or as new information is received (e.g., from the intermediate node and/or other sources). In one example, a user's behavior may be monitored to determine a hit rate associated with a user's interaction with email content objects pushed to the user's mobile device. The hit rate may indicate, for example, a rate at which a user opens, reads, forwards, replies to, and/or otherwise interacts with email pushed to the user's device. In the event that the hit rate is below a threshold, does not meet a certain ratio, and/or is otherwise less desirable, the behavior model may be updated to increase the hit rate.

At 440, information associated with the behavior model may be provided to the intermediate node and/or other node. In various embodiments, information associated with the behavior model may include the behavior model and/or portions of the behavior model. In some embodiments, information associated with the behavior model may include information including outputs (e.g., all possible outputs) of the behavior model. In various embodiments, information associated with the behavior model may include an abstract representation of the behavior model. In certain cases, information associated with the behavior model may include rules generated (e.g., at the analytics engine, MDM platform, or other node) based on the behavior model. In other cases, rules may be generated based on the behavior model at the intermediate node. The intermediate node may store the information associated with the model (e.g., behavior model, information including outputs of the model, etc.) in memory.

Figure 5:
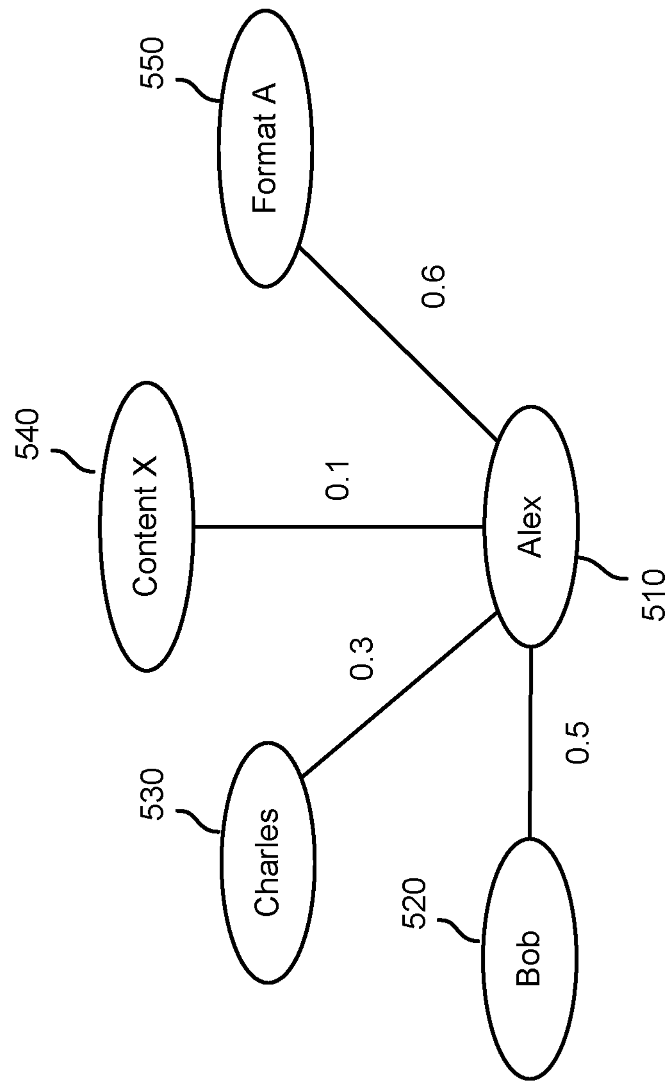
FIG. 5 is a block diagram illustrating an embodiment of a behavior model.

FIG. 5 is a block diagram illustrating an embodiment of a behavior model. In the example shown, a behavior model 500 for a user Alex 510 includes Alex's connection Bob 520, Alex's contact Charles 530, a Content Type X 540, a Content Format A 550, and/or other elements (e.g., attributes). In the example behavior model 500, the elements of the model (e.g., a user's connections and/or attributes) may each be associated with a weight. For example, an element including Alex's connection Bob 520 may be associated with a first weight 0.5. The first weight 0.5 may be determined based on Alex's observed read rate, response time, and/or other observed activities related to emails received from Bob; Alex and Bob's connection/friendship on a social network; and/or other information. An element associated with Alex's contact Charles 530 may be associated with a second weight 0.3. The second weight 0.3 may be determined based on Alex's observed response to emails received from Charles, Alex and Charles membership in an enterprise group as indicated in an enterprise directory, and/or other information. The Content Type X 540 (e.g., content on a topic, subject of content, etc.) may be associated with a third weight 0.1. The third weight 0.1 may be determined based on Alex's observed interest in the topic as indicated by Alex's posts on an enterprise wiki page and/or social network, Alex's relatively quick response time to emails including the topic, and/or other information. The Content Format A 550 (e.g., a file type) may be associated with a fourth weight 0.6. The fourth weight 0.6 may be determined based on device state information associated with Alex's mobile device that indicates Alex's email client and/or an application on Alex's device can open certain file types and/or other information. The weights associated with each of the user's connections, content attributes, and/or other attributes may be determined during a model generation operation (e.g., a learning operation) as discussed herein.

As discussed below, the user information, content-related information, and/or other information and associated weights in the behavior model 500 may be applied to attributes associated with a content object to determine a manner of delivering the content object to a mobile device. In one example application of the behavior model 500, an email content object sent from Bob 520 to Alex 510 that includes an attachment of Format A 550 (e.g., a PDF) may be associated with a high score. Based on the determined high score, the email from Bob to Alex may be pushed to Alex's mobile device with all attachments. In contrast, application of the behavior model 500 to an email from Charles 530 to Alex 510 that is determined to be associated with Context X 540 (e.g., finance), a topic with which Alex is minimally interested (e.g., as indicated by the lower weight 0.1), may result in a lower score. The lower score may be below a threshold, and based on the determination that the lower score is below the threshold, a truncated version of the email from the Charles to Alex may be pushed to Alex's mobile device. And Alex may be able to pull the remaining content to his device upon opening the email (if ever).

Figure 6:
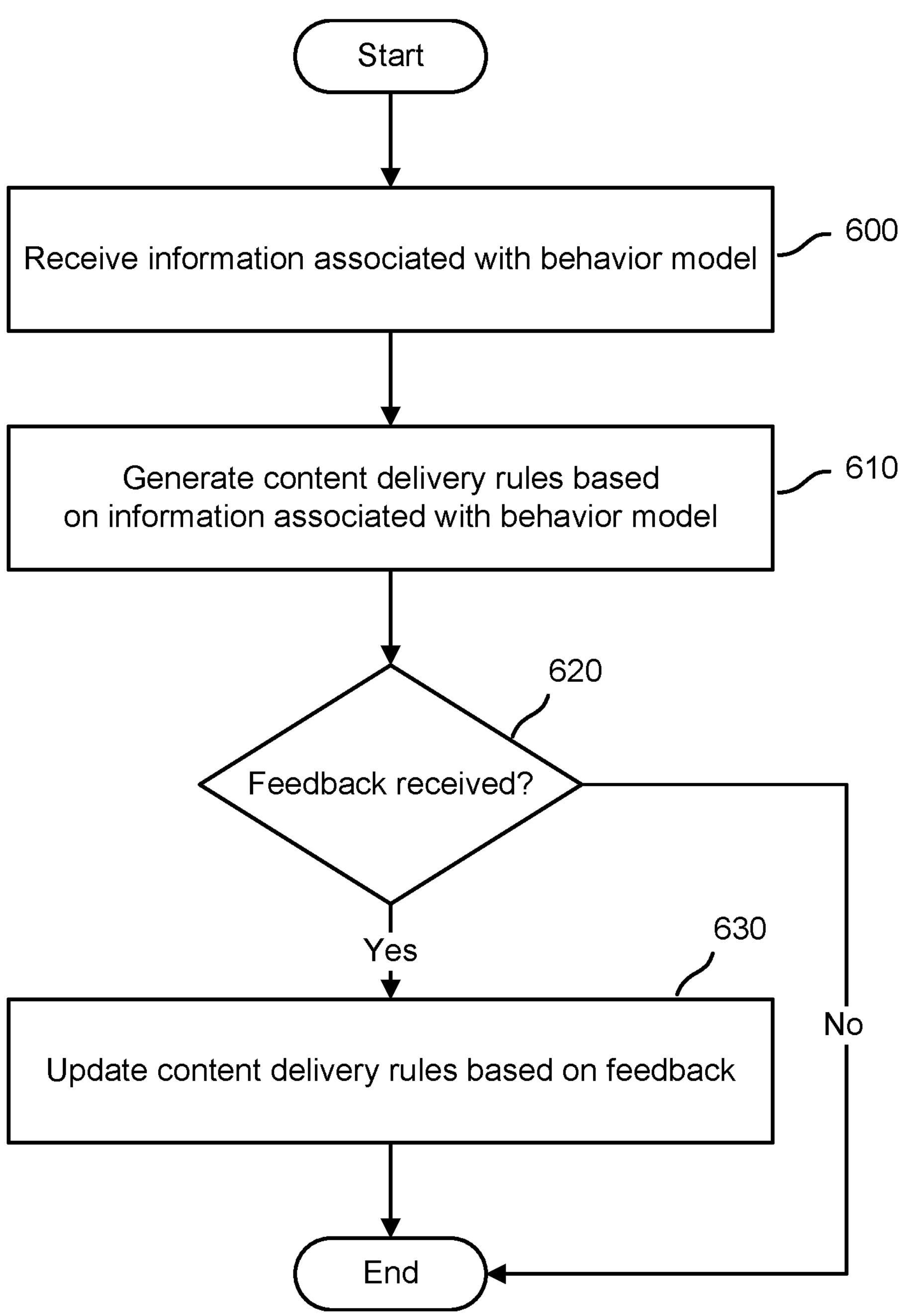
FIG. 6 is a flow chart illustrating an embodiment of a process to generate content delivery rules.

FIG. 6 is a flow chart illustrating an embodiment of a process to generate content delivery rules. In various embodiments, this process may be implemented at intermediate node 110, content server 140, and/or another node of FIG. 1. At 600, information associated with a behavior model may be received (e.g., at an intermediate node, proxy, etc.). In various embodiments, information associated with behavior model be received (e.g., retrieved) from an analytics engine. For example, a behavior model and/or updated version of a behavior model may be received periodically, upon generation of the model, and/or at other times. In another example, information including the outputs (e.g., all possible outputs) of a behavior model, an abstract representation of the model, and/or other information may be received.

At 610, content delivery rules and/or policies may be generated based on the information associated with the behavior model. In various embodiments, the information associated with the behavior model may include the behavior model and/or a portion thereof, and the behavior model may be processed to determine one or more content delivery rules. For example, outputs of a behavior model may be determined, and content delivery rules may be generated based on the outputs of the behavior model. A content delivery rule/policy may, for example, define, for a set of content object attributes, a manner of delivering a content object. One example content delivery rule and/or policy may dictate that content sent from a certain person (e.g., the user's manager), during business hours, and/or while the user is at work be pushed to the user's device with all attachments. Another example content delivery rule and/or policy may dictate that emails sent from a known sender with a weak social connection (e.g., no indication of connection in a social network, enterprise directory, etc.) that are sent while the user is roaming be held at an intermediate node and/or content server until the user checks for mail (e.g., refreshes the email client inbox). An additional content delivery rule and/or policy may dictate that email content objects of a certain file type be pushed to an application configured to display the content (e.g., a file viewer application) rather than pushing the content object to the email client. These example rules and other rules may be generated based on outputs of the behavior model and/or other application of the behavior model. In various embodiments, any combination of application policies, settings, and/or feature may be modified based on satisfaction of content delivery rules.

At 620, it may be determined if feedback is received. In various embodiments, active feedback may be received from a user of a mobile device. In one example, a representation of the behavior model may be output to a user (e.g., a relational view of the model, a graphical model, etc.), and the user may provide feedback to update the model. In another example, a user may provide commands and/or define rules in an interface. In some embodiments, passive feedback may be received (e.g., based on observed user's interaction with content objects). In the event feedback is received, the process may proceed to step 630. In the event feedback is not received, the process may end.

At 630, content delivery rules may be updated based on feedback. In various embodiments, a user may provide active feedback (e.g., inputs, commands to update a model, etc.). In one example, a representation of the behavior model may be output to a user (e.g., a relational view of the model, a graphical model, etc.), and the user may provide feedback to update the model. For example, a user may update a weight associated with a topic (e.g., cryptography) included in a representation of a behavior model such that future content objects (e.g., emails, documents, etc.) associated with the topic are pushed to the user's mobile device. As a result, a rule associated with the topic of cryptography may be updated to require that any content objects including content associated with cryptography be pushed to a user's mobile device. In a further example, a user may apply an importance tag to an email, and the behavior model may be updated such that future emails that are similar to the tagged email will be pushed to the user's device. In some embodiments, users may enter rules in a rule definition interface. For example, a user (e.g., an employee of an enterprise) may enter a rule dictating that emails from a co-worker be pulled (e.g., not pushed) to the user's device when the user checks their email. This input may reduce a weight associated with the co-worker in the behavior model. Based on this reduced weight, a rule associated with the co-worker may be updated to not push emails from the co-worker to the user's mobile device.

In some embodiments, content delivery rules and/or policies may be generated and/or applied independent of the behavior model. As discussed below, content deliver rules and/or policies may be applied independent of and/or in conjunction with the application of a behavior model to attributes associated with a content object.

Figure 7A:
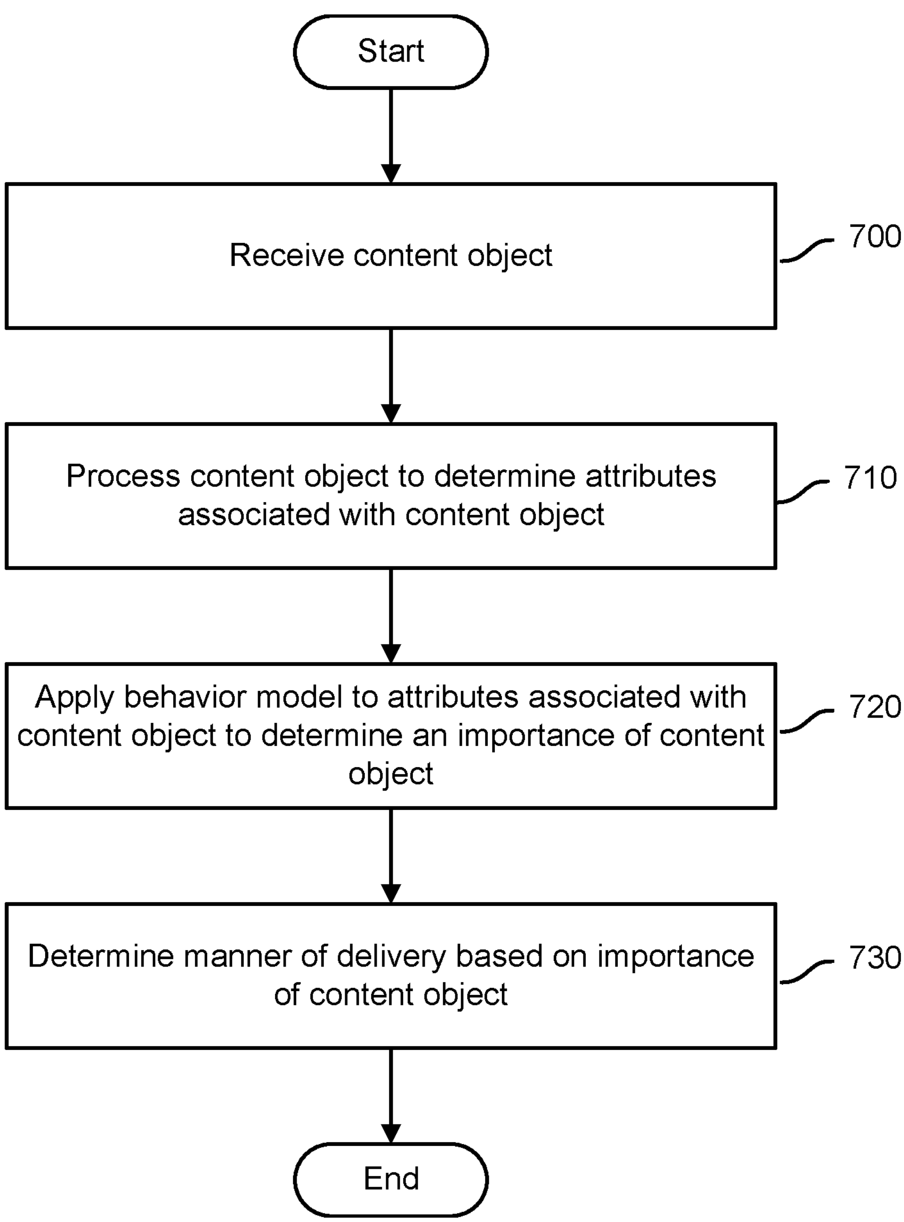
FIG. 7A is a flow chart illustrating an embodiment of a process of content delivery optimization.

FIG. 7A is a flow chart illustrating an embodiment of a process of content delivery optimization. In various embodiments, this process may be implemented at intermediate node 110, content server 140, and/or another node of FIG. 1. At 700, a content object may be received. In various embodiments, a content object may be received at an intermediate node situated between a content server and mobile device. For example, a mobile device (e.g., in an MDM environment) may be associated with a proxy (e.g., reverse proxy), and content sent to and from the mobile device may pass through the proxy. In certain cases, the proxy may be configured to process content objects and/or determine an appropriate manner of content object delivery as discussed herein. For example, an enforcement node (e.g., enforcement node 114 of FIG. 1) may be configured to process content objects to determine attributes associated therewith, apply information associated with the behavior model and/or rules/policies to the attributes, and/or determine a manner of content delivery based on the application of the rules/model. In some embodiments, a content object may be received at a content server (e.g., email server, enterprise data server, etc.) from, for example, a node within the content server, a mobile device, another content server, and/or other node.

At 710, the content object may be processed to determine one or more attributes associated with the content object. In various embodiments, a content object received at an intermediate node may be processed (e.g., parsed) to extract one or more content attributes. In one example, an email content object may be parsed to extract the sender of the email, recipients of the email, size of the email, whether the email includes attachments, a language of content in the email, content topics included in the email, and/or other attributes associated with the email content object. In another example, a file (e.g., a document, word processing document, spreadsheet, PDF, etc.) may be processed to extract an author of the file, editors of the file, topics associated with the file content, metadata associated with the file, a language of content in the file, a file type associated with the file, a file size associated with the file, and/or any other attributes associated with the file.

At 720, a behavior model is applied to attributes associated with the content object to determine an importance of the content object. In various embodiments, a behavior model for a user may include various elements (e.g., other users, content attributes, observed user activities, etc.), and the behavior model may be applied to attributes of the content object. In one example, a behavior model may include elements and a weight for each element. The elements and associated weights may be applied to the content attributes to determine a rank, score, importance, and/or other value for the content object.

At 730, a manner of delivery may be determined based on the importance associated with the content object. In various embodiments, the importance, rank and/or other value may be compared to one or more thresholds, and a manner of delivery may be determined based on the comparison of the rank to the thresholds.

In one example, a behavior model for a first user (e.g., an employee) may include elements of a group of users (e.g., employees in the user's department), a content topic (e.g. airplanes), content format (e.g., Microsoft™ Word document), and/or other elements. Each of the elements in the behavior model may be associated with a weight. In applying the behavior model to attributes associated with the content object, the attributes may be matched to elements of the model and the weights associated with each matched element may be used to generate a rank, score, importance value, and/or other indicator. For example, attributes associated with an email content object may indicate that the emails is from a user in the group of users (e.g., employees in the user's department) and includes content associated with the topic of airplanes. These attributes may be matched to elements in the model and weights associated with the elements may be used to generate a rank, importance value, score, and/or other indicator for the email.

In some embodiments, a behavior model may include a probability model (e.g., probabilistic model). Attributes associated with the content object may be provided to the probability model to determine a rank, score, importance value, and/or other indicator for the content object. In one example, a behavior model may be used to determine whether to push an email (e.g., a full email) to a user's mobile device or to provide a truncated version of the email to the user's device. Applying the behavior model, conditional probabilities that the email should be pushed to the mobile device given each of the attributes may be calculated. For example, a conditional probability that an email should be pushed given that the email is from a certain person (e.g., the user's manager) may be calculated. A conditional probability that the email should be pushed to a user's mobile device given that the user's mobile device is in a certain location (e.g., at the user's place of employment) may be calculated. Conditional probabilities that the email should be pushed given each of the other attributes may also be calculated. Each of the conditional probabilities may be integrated, summed, have the max function applied to, and/or otherwise processed to generate a value (e.g., score) associated with pushing the email. A similar process of generated conditional probabilities and combining the conditional probabilities to generate a value may be performed to evaluate a decision not to push the email. The two scores (e.g., a score for pushing the email and a score for not pushing the email) may be compared, and a determination to push the email or not push the email may be made based on the comparison.

In one example implementation of the techniques disclosed herein in various embodiments, an email addressed to (e.g., sent to) a user may be received at an intermediate node (e.g., an enterprise email proxy). Upon receipt, the intermediate node may query an analytics server (e.g., a Hadoop cluster) with a key induced from a unique identifier (e.g., a unique identifier associated with a behavior model), a current user, and/or the email's author (e.g., a person including in the email from field). In the event, a value received (e.g., pulled) from analytics server (e.g., Hadoop cluster) is below a threshold, delivery of the email content object may be executed (e.g., the email content object may be pushed to the mobile device). In the event the received value (e.g., stored value) is above a threshold, delivery of the email content is not executed (e.g., the email object is held at the content server and/or intermediate node). In the event the email content is missing on the device after content delivery and the user selects the email, the content may be downloaded to the mobile device on demand. In various embodiments, the intermediate node and/or analytics engine may track whether or not a user has selected an email by keeping a counter for each individual email. This counter may be stored, for example, at the analytics engine (e.g., Hadoop cluster) to track the number of email client fetches (e.g., Activesync fetches) done per individual email. A number greater than a threshold may deem the individual email 'selected by user'.

Figure 7B:
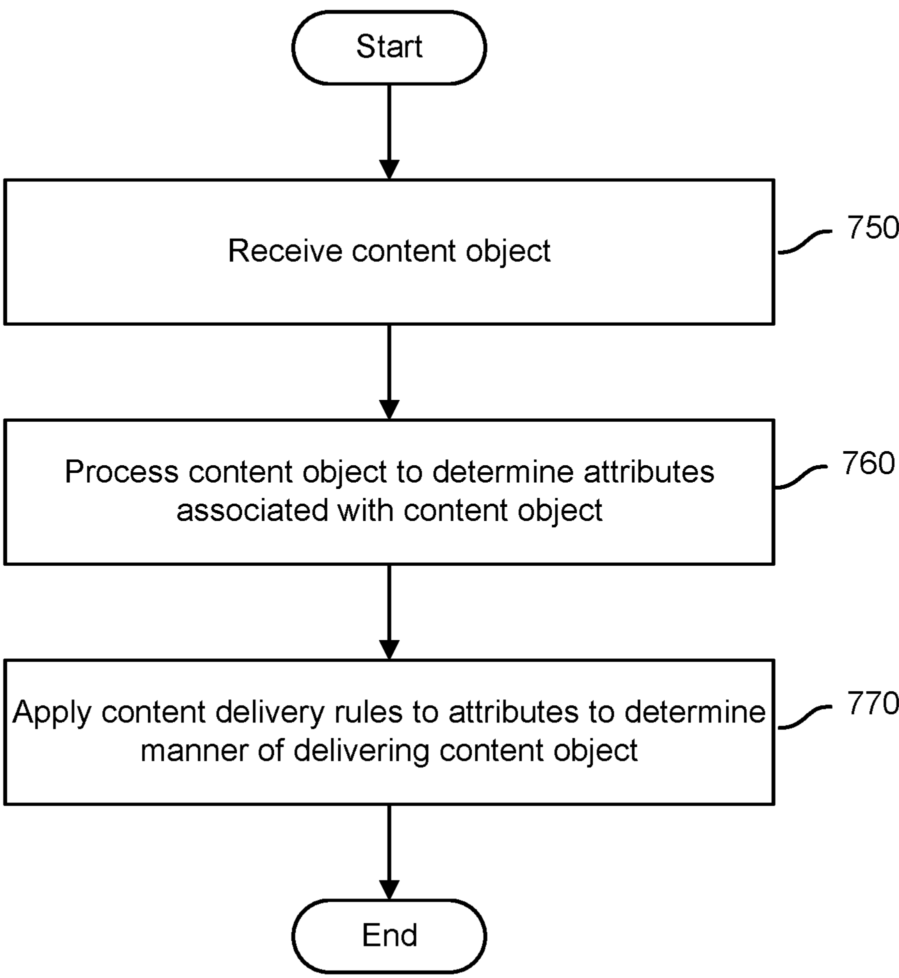
FIG. 7B is a flow chart illustrating an embodiment of a process of content delivery optimization.

FIG. 7B is a flow chart illustrating an embodiment of a process of content delivery optimization. In various embodiments, this process may be implemented at intermediate node 110, content server 140, and/or another node of FIG. 1. At 750, a content object may be received. In various embodiments, a content object may be received at an intermediate node situated between a content server and mobile device.

At 760, a content object may be processed to determine attributes associated with the content object. In various embodiments, a content object received at an intermediate node may be processed (e.g., parsed) to extract one or more content attributes.

At 770, content delivery rules may be applied to the attributes to determine a manner of delivering a content object. In various embodiments, content delivery rules may be generated based on, for example, a behavior model, input from a user (e.g., active feedback defining a rule), enterprise input (e.g., from an enterprise administrator), device state information, and/or other information. A rule and/or policy may include one or more conditions which when satisfied trigger the application of a manner of content delivery and/or other operations. In one example, a rule and/or policy may be defined that is triggered when a mobile device is determined to be roaming. When it is determined based on, for example, device state information that the user's mobile device is roaming, the rule may dictate that only content objects (e.g., emails) labeled as important emails be pushed to the device and all other content objects may be held at the intermediate node. In another example, a rule and/or policy may be triggered when a mobile device is connected to a WiFi network (e.g., as determined from mobile device state information), and the rule may dictate that all content objects be pushed to the device over the WiFi connection. In a further example, a rule and/or policy may require that all emails from a set of senders (e.g., the user's managers) be pushed to the user's device with all attachments. In another example, a rule and/or policy may require that all content sent to user be converted to a certain language.

In various embodiments, content delivery rules may be applied in conjunction with a behavior model. In certain cases, application of content delivery rules to attributes may supercede (e.g., may be performed prior to) application of a behavior model to the attributes. For example, content delivery rules (e.g., a set of content delivery rules) may be applied to attributes associated with content object, and in the event that one or more content delivery rules are triggered (e.g., satisfied), a manner of content delivery dictated by the one or more rules may be selected. If, for example, a content delivery rule is satisfied the requires email be pushed to a mobile device, the email may be pushed to the device regardless of whether application of the behavior model would result in another manner of content delivery. In the event that no content delivery rules are triggered (e.g., satisfied), a behavior model may be applied to the content attributes to determine a manner of delivering the content object to the mobile device. In various embodiments, a manner of delivering a content object may be determined based on the application of content delivery rules and the behavior model. For example, a content delivery rule may be triggered that requires a content object (e.g., email) to be pushed to the device while application of a behavior model to the attributes of the content object may require that email text be cropped. In this case, the manner of content delivery may include pushing the email to the mobile device with cropped content (e.g., truncated content).

Figure 8:
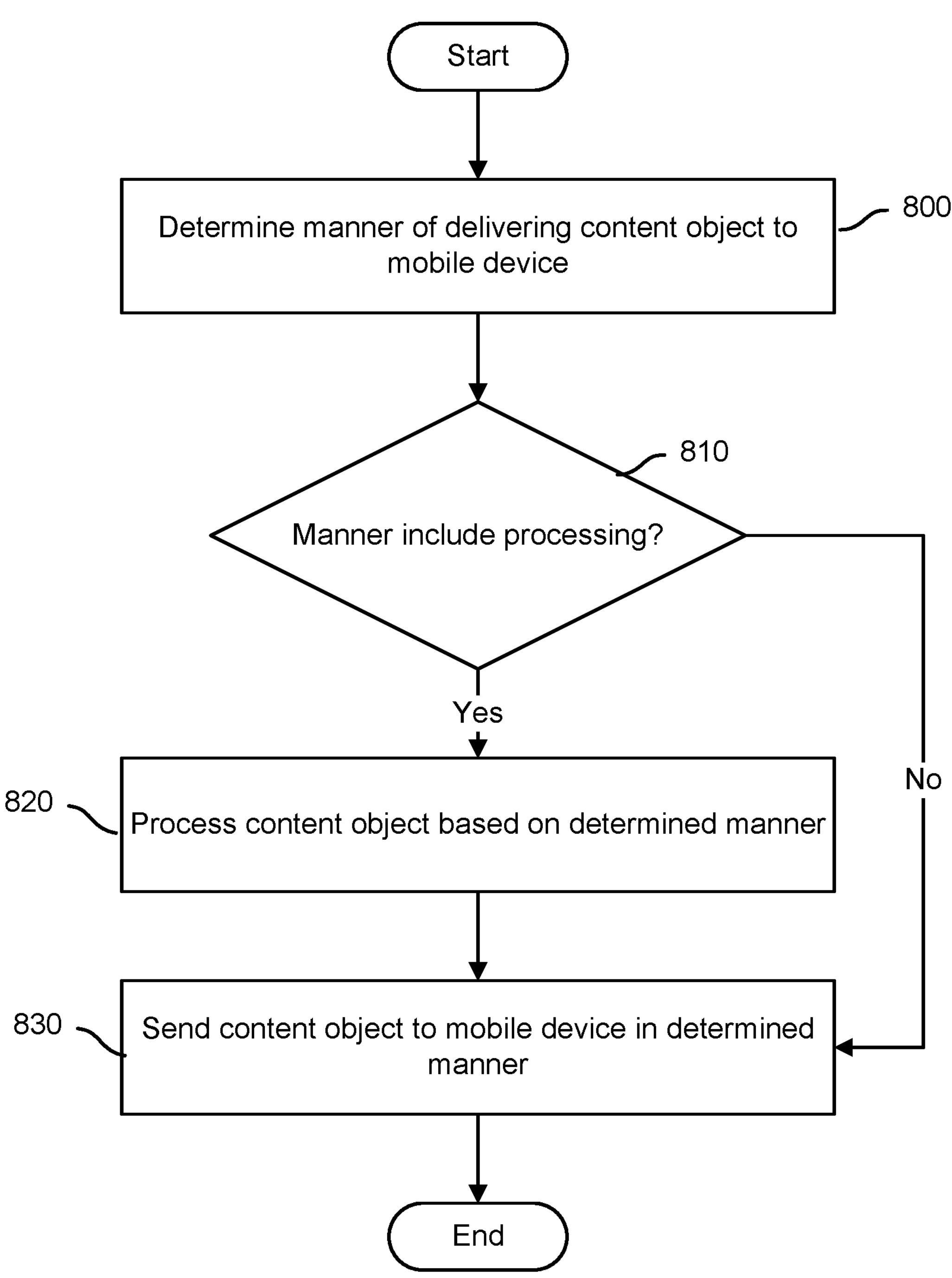
FIG. 8 is a flow chart illustrating an embodiment of a process of performing a manner of content delivery.

FIG. 8 is a flow chart illustrating an embodiment of a process of performing a manner of content delivery. In various embodiments, this process may be implemented at intermediate node 110, content server 140, and/or another node of FIG. 1. At 800, a manner of delivering a content object to a mobile device may be determined. In various embodiments, a manner of delivering the content object may include any data transfer and/or data processing approach. In the context of email, a manner of delivering a content object may include, for example, pushing (e.g., sending) the email to the mobile device, pushing the email to the mobile device along with a message on an alternate channel (e.g., text message, voice call, etc.), pushing a portion of the email (e.g., a truncated version of the email (e.g., including a link to pull full content), a summary of the email, etc.) to the device, pushing a version of the email without attachments to the mobile device, not pushing (e.g., providing) the email to the device (e.g., until the user fetches the email), and/or any other manner of delivering content to the device. In the context of other types of content, a manner of delivering a content object may include providing the content object to the mobile device unchanged (e.g., unprocessed), reducing the size of the content object (e.g., zipping/cropping the content object, shrinking an image file using an image processor), providing a link to the content object (e.g., a link to download the content object), converting the content object to a format compatible with the device (e.g., converting a word processing document to PDF), providing a link to an application configured to provide access to the content object (e.g., a link to download the application, a link to launch the application, etc.) securing the content object (e.g., encrypting the content object) and sending the secured content object, and/or other manner of delivering content to the device.

At 810, it may be determined whether the manner of content delivery includes a processing operation. In various embodiments, a manner of content delivery may include a processing operation to prepare a content object for delivery to the mobile application. In the event it is determined that a processing operation is to be performed, the process may proceed to step 820. In the event it is determined that no processing is to be performed, the process may proceed to step 830.

At 820, a content object may be processed based on the determined manner of content delivery. In various embodiments, a content object may be processed (e.g., at the intermediate node, content server, etc.) prior to being sent to the mobile device. Example processing operations may include reducing the size of a content object (e.g., cropping a first x kB of content), converting a content object from a first format (e.g., a first file type) to a second format, translating content from a first language to a second language, truncating content and adding a link (e.g., to full content), removing attachments from a content object (e.g., email), adding a link in the content object to relevant information (e.g., calendar events, social network, enterprise wiki page, etc.), providing the mobile device an application to load the content object, securing a content object (e.g., encrypting a content object), and/or any other processing operations.

In one example, a content object determined to be incompatible with a recipient device may be converted to a compatible file type. For example, a computer aided design (CAD) file may be converted to a PDF file, image file, and/or other type of file if it is determined that the mobile device does not include and application to view CAD files. In another example, a manner of delivering a content object may include sending the content object to the device via multiple messaging channels. In this case, the content object (e.g., email) may be processed for delivery via the multiple channels. For example, an email content object and/or a version thereof may be processed for delivery as a text message, voice call, voice message, MDM-associated push message, and/or via another channel. In a further example, it may be determined that a content object is to be delivered to a specific application (e.g., a content viewer application), and the content object may be processed for delivery to the specific application.

At 830, the content object may be sent to the mobile device in the determined manner. In various embodiments, a content object may be sent to the mobile via one or more communication approaches (e.g., email, short message service (SMS), multimedia message service (MMS), an enterprise messaging service, voice call, direct voice mail, and/or other channel). In one example manner of delivering a content object, an email content object may be pushed to the device, and in the event the email is not read within a period of time, a version of the email content object may be sent to the device via an alternate channel (e.g., text message) after modifying the content for the alternate channel. This manner of content delivery may be used for important messages (e.g., calendar meeting cancellation notices, emails from an important sender, etc.). In another example, it may be determined that a content object is not compatible with the software (e.g., applications) included on the mobile device. In this case, the content object may not be pushed (e.g., push may be delayed) until the device is configured to process the file type. An application compatible with the content object may be retrieved and/or provided to the mobile device (e.g., via the MDM platform) for installation. In some embodiments, a link to the application may be provided to the user (e.g., via push notification, email, text message, etc.), and the user may initiate installation of the application. Upon installation of the application, the content object may be pushed to the device. For example, an email may include a CAD file, and it may be determined that the recipient mobile device does not include an application to view CAD files. A CAD file viewer application may be retrieved and provided to the device (e.g., prior to pushing the email to the device). Upon installation of the CAD viewer, the content object may be pushed to the device. In another example, an email client on a user's device may be updated to display an email list view that lists emails by message importance (e.g., as determined based on the behavior model, content delivery rules, etc.). Similarly machine assigned tags may be applied to messages delivered to the mobile device.

According to some embodiments, the techniques disclosed herein may be used to prioritize a user's actions. For example, if content includes "John, please comment by Dec. 31, 2014" and John is the owner of the target device, the request should be delivered to John's device. And a "task item," "calendar item," alert (e.g., push notification), and/or other reminder may be generated to alert John of the task. In certain cases, generation of alerts may be configurable by the user (e.g., based on user input to the mobile device).

In various embodiments, the techniques disclosed herein may improve an email client. From an email client user's perspective, the email client is augmented based on the user's usage history from mobile devices. The usage history is reflected in a behavior model associated with the user. For example, as the user selects individual emails, prioritized emails may be preloaded in the client, while lower priority emails will be retrieved from the server. If the device is on WiFi, all emails will be fully retrieved from the server. The user experience may be preserved while data use optimized. From an administrator's (e.g., enterprise administrator) point of view, an administrator may better understand an organization. For example, a behavior model can be leveraged to expose information such as an organization's language, user clique identification, and/or topic trends. In certain cases, a dashboard may expose these insights to the administrator.

According to some embodiments, the techniques disclosed herein may be leveraged to assist a user while generating content. For example, if a collection engine (e.g., including an activity monitor in conjunction with an analytics engine and/or other components) is applied to, for example, email or instant messaging, a group/organization specific language may emerge. The extracted language can be fed back and utilized by the device and app to enable auto-completion, response assistance, and/or other functions.

In various embodiments, the techniques disclosed herein may be leveraged to help an enterprise better understand itself. The analysis of the email and/or other content traffic is analogous to mining a social network. For example, the interactions between users and groups may be analyzed to help an enterprise understand its organization. Authorities in the social network can help enterprises evaluate their talent. Experts on a specific topic can be identified based on user activity data, information from social sources, and/or other sources regardless of the expert's organization group, location, and/or company title. Using the techniques disclosed herein an enterprise may become more efficient. For example, when someone wants to find employee that is a 'single sign on' expert, the techniques disclosed herein can help find the employee.

In some embodiments, the extracted language from content can be utilized to improve enterprise search relevancy. Enterprise search may, for example, lack meaningful statistics because of population limitations, and a user's language and behavior on certain text may provide to be a meaningful signal utilized by enterprise search engines.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of content delivery implemented at an intermediate node that is separate from a mobile device and a content server, the method comprising:

receiving information from one or more sources, wherein the information indicates social network information of a user, enterprise directory information, and device state information of the mobile device;

processing the information into a set of attributes, wherein the set of attributes includes a first attribute and a second attribute;

during a training phase:

determining a first conditional probability to deliver a content object according to a data processing approach of a manner of content delivery based on the first attribute and first observed interactions of a user with respect to one or more previous content objects having the first attribute sent to a mobile device, wherein the first observed interactions include an action of the user after receipt of the one or more previous content objects having the first attribute;

determining a second conditional probability to deliver the content object according to the data processing approach of the manner of content delivery based on the second attribute and second observed interactions of the user with respect to one or more previous content objects having the second attribute sent to the mobile device, wherein the second observed interactions include an action of the user after receipt of the one or more previous content objects having the second attribute; and generating a probabilistic behavior model based at least in part on a combination of the first and the second conditional probabilities;

generating a content delivery rule, wherein the content delivery rule triggers, based on the first and second attributes associated with a content object, a data transfer approach of the manner of content delivery;

receiving, from a content server, a content object in route to the mobile device;

processing the received content object to determine that the first attribute and the second attribute are associated with the received content object;

determining to deliver the received content object to the mobile device according to the data transfer approach of the manner of content delivery based on application of the content delivery rule;

applying the probabilistic behavior model to modify the received content object according to the data processing approach of the manner of content delivery to generate a modified content object; and providing, to the mobile device via a network to which the mobile device is connected, the modified content object in place of the received content object using the data transfer approach of the manner of content delivery.

2. The method of claim 1, wherein:

the data transfer approach of the manner of content delivery includes pushing the received content object;

the received content object includes an email;

the first attribute includes a sender of the email;

the intermediate node is an email proxy;

the modified content object includes only a first portion of the received content object; and a remaining portion of the received content object is provided to the mobile device in response to the user interacting with the modified content object.

3. The method of claim 1, further comprising determining a third conditional probability to deliver the content object according to a second manner of content delivery based on a third attribute of the set of attributes and observed interactions of the user with respect to one or more previous content objects having the third attribute that were sent to the mobile device, wherein:

the second manner of content delivery is different from the first manner of content delivery; and the probabilistic behavior model is further based on the third conditional probability.

4. The method of claim 1, further comprising determining a third conditional probability based on a third attribute associated with the content object and third observed interactions of the user with respect to one or more previous content objects having the third attribute that were sent to the mobile device, wherein:

the probabilistic behavior model is further based on the third conditional probability.

5. The method of claim 1, further comprising:

receiving active feedback; and updating the content delivery rule based at least in part on the active feedback.

6. The method of claim 1, wherein the first and the second attributes include one or more of user-associated attributes, content-associated attributes, and mobile device-associated attributes.

7. The method of claim 1, wherein the first attribute includes one or more or a combination of:

an author of the received content object, content associated with the received content object, a sender of the received content object, and a recipient of the received content object.

8. The method of claim 1, wherein the modified content object includes one or more of:

a truncated version of the content object to the mobile device;

the content object without attachments;

a link to the content object;

a summary of the content object;

a secured version of the content object to the mobile device;

a link to an application configured to provide access to the content object;

a task item related to the content object; and a translated version of the content object from a first language to a second language.

9. The method of claim 1, wherein:

the first attribute is representative of a first domain of information; and the second attribute is representative of a second domain of information that is separate from the first domain of information.

10. A computer program product, the computer program product being embodied in a tangible non-transitory computer readable storage medium and comprising computer instructions to perform operations of content delivery, the operations comprising:

receiving, at an intermediate node, information from one or more sources, wherein the information indicates social network information of a user, enterprise directory information, and device state information of a mobile device;

processing the information into a set of attributes, wherein the set of attributes includes a first attribute and a second attribute;

during a training phase:

determining a first conditional probability to deliver a content object according to a data processing approach of a manner of content delivery based on the first attribute and first observed interactions of a user with respect to one or more previous content objects having the first attribute sent to a mobile device, wherein the first observed interactions include an action of the user after receipt of the one or more previous content objects having the first attribute;

determining a second conditional probability to deliver the content object according to the data processing approach of the manner of content delivery based on the second attribute and second observed interactions of the user with respect to one or more previous content objects having the second attribute sent to the mobile device, wherein the second observed interactions include an action of the user after receipt of the one or more previous content objects having the second attribute; and generating a probabilistic behavior model based at least in part on a combination of the first and the second conditional probabilities;

generating a content delivery rule, wherein the content delivery rule triggers, based on the first and second attributes associated with a content object, a data transfer approach of the manner of content delivery;

receiving, from a content server, a content object in route to the mobile device;

processing the received content object to determine that the first attribute and the second attribute are associated with the received content object;

determining to deliver the received content object to the mobile device according to the data transfer approach of the manner of content delivery based on application of the content delivery rule;

applying the probabilistic behavior model to modify the received content object according to the data processing approach of the manner of content delivery to generate a modified content object; and providing, to the mobile device via a network to which the mobile device is connected, the modified content object in place of the received content object using the data transfer approach of the manner of content delivery.

11. The computer program product of claim 10, wherein:

the data transfer approach of the manner of content delivery includes pushing the received content object;

the received content object includes an email;

the first attribute includes a sender of the email;

the intermediate node is an email proxy;

the modified content object includes only a first portion of the received content object; and a remaining portion of the received content object is provided to the mobile device in response to the user interacting with the modified content object.

12. The computer program product of claim 10, wherein:

the operations further comprise determining a third conditional probability to deliver the content object according to a second manner of content delivery based on a third attribute of the set of attributes and observed interactions of the user with respect to one or more previous content objects having the third attribute that were sent to the mobile device;

the second manner of content delivery is different from the manner of content delivery; and the probabilistic behavior model is further based on the third conditional probability.

13. The computer program product of claim 10, wherein:

the operations further comprise determining a third conditional probability based on a third attribute associated with the content object and third observed interactions of the user with respect to one or more previous content objects having the third attribute that were sent to the mobile device;

the probabilistic behavior model is further based on the third conditional probability.

14. The computer program product of claim 10, wherein the operations further comprise:

receiving active feedback; and updating the content delivery rule based at least in part on the active feedback.

15. The computer program product of claim 10, wherein the first and the second attributes include one or more of user-associated attributes, content-associated attributes, and mobile device-associated attributes.

16. The computer program product of claim 10, wherein:

the first attribute includes one or more or a combination of: an author of the received content object, content associated with the received content object, a sender of the received content object, and a recipient of the received content object; and the modified content object includes one or more of: a truncated version of the content object to the mobile device, the content object without attachments, a link to the content object, a summary of the content object, a secured version of the content object to the mobile device, a link to an application configured to provide access to the content object, a task item related to the content object, and a translated version of the content object from a first language to a second language.

17. The computer program product of claim 10, wherein:

the first attribute is representative of a first domain of information; and the second attribute is representative of a second domain of information that is separate from the first domain of information.

* * * * *